US006804102B2

(12) United States Patent
Hamon et al.

(10) Patent No.: US 6,804,102 B2
(45) Date of Patent: Oct. 12, 2004

(54) VOLTAGE REGULATOR PROTECTED AGAINST SHORT-CIRCUITS BY CURRENT LIMITER RESPONSIVE TO OUTPUT VOLTAGE

(75) Inventors: Cécile Hamon, Grenoble (FR); Christophe Bernard, Claix (FR); Alexandre Pons, Grenoble (FR)

(73) Assignee: STMicroelectronics S.A., Montrouge (FR)

( * ) Notice: Subject to any disclaimer, the term of this patent is extended or adjusted under 35 U.S.C. 154(b) by 0 days.

(21) Appl. No.: 10/257,233

(22) PCT Filed: Jan. 18, 2002

(86) PCT No.: PCT/FR02/00219

§ 371 (c)(1), (2), (4) Date: Jan. 21, 2003

(87) PCT Pub. No.: WO02/057863

PCT Pub. Date: Jul. 25, 2002

(65) Prior Publication Data

US 2003/0147193 A1 Aug. 7, 2003

(30) Foreign Application Priority Data

Jan. 19, 2001 (FR) .......................................... 01 00745

(51) Int. Cl.[7] .......................................... H02H 3/08
(52) U.S. Cl. .......................................... 361/93.3
(58) Field of Search .......................................... 323/274–277, 323/280, 281; 361/93.9, 18

(56) References Cited

U.S. PATENT DOCUMENTS

| | | | | | |
|---|---|---|---|---|---|
| 4,346,342 | A | * | 8/1982 | Carollo | 323/276 |
| 4,704,572 | A | * | 11/1987 | Melbert | 323/275 |
| 5,041,777 | A | * | 8/1991 | Riedger | 323/277 |
| 5,563,500 | A | * | 10/1996 | Muterspaugh | 323/282 |
| 6,201,674 | B1 | * | 3/2001 | Warita et al. | 361/18 |
| 6,580,257 | B2 | * | 6/2003 | Marty | 323/280 |

FOREIGN PATENT DOCUMENTS

| | | | | | |
|---|---|---|---|---|---|
| DE | 0529605 | A1 | * | 3/1993 | H02H/9/02 |
| EP | 0550823 | A1 | * | 11/1992 | H02H/9/02 |
| EP | 0913753 | A1 | * | 10/1997 | G05F/1/573 |
| EP | 0987615 | A1 | * | 3/2000 | G05F/1/573 |

OTHER PUBLICATIONS

James Wong, Spannungsregler mit minimaler Verlustleistung, Jun. 1991, 2087 Elektronik, pp. 96–102.*

* cited by examiner

*Primary Examiner*—Shawn Riley
(74) *Attorney, Agent, or Firm*—Lisa K. Jorgenson; Robert Iannucci; Seed IP Law Group PLLC

(57) ABSTRACT

A voltage regulator having an output terminal adapted to being connected to a load, including a device for limiting the current flowing through the load to a first threshold current if the voltage of the output terminal is lower than a threshold voltage, and to a second current threshold higher than the first current threshold if the voltage of the output terminal is greater than the threshold voltage.

29 Claims, 4 Drawing Sheets

VOLTAGE REGULATOR PROTECTED AGAINST SHORT-CIRCUITS BY CURRENT LIMITER RESPONSIVE TO OUTPUT VOLTAGE

BACKGROUND OF THE INVENTION

1. Field of the Invention

The present invention relates to the field of voltage regulators and in particular to regulators with a low drop out.

2. Description of the Related Art

A low drop out (LDO) regulator made in the form of an integrated circuit may be used to provide a predetermined voltage with low noise to a set of electronic circuits from a supply voltage provided by a rechargeable battery. Such a supply voltage decreases along time and is likely to include noise caused by the action of neighboring electromagnetic radiations on the battery-to-regulator connections. The regulator is said to have a low drop out since it enables providing a voltage close to the supply voltage.

FIG. 1 schematically shows a conventional low drop out regulator. The regulator includes an output terminal O provided to be connected to a load R. Load R, which is essentially resistive, represents the general input impedance of all the circuits supplied by the regulator. For simplicity, it is considered hereafter that load R is a resistor. The regulator includes an operational amplifier 2 having an inverting input $E^-$ connected to a positive reference voltage Vref and having a non-inverting inverting input $E^+$ connected to output terminal O by a feedback loop. Operational amplifier 2 is supplied between a positive supply voltage Vbat provided by the battery and a ground voltage GND. A P-channel MOS power transistor T1 has its drain connected to output terminal O and its source connected to voltage Vbat. The gate of transistor T1 is connected to the output terminal of inverting amplifier 2. Transistor T1 is a MOS transistor, especially to minimize, with respect to the use of a bipolar transistor, the difference between output voltage Vout of terminal O and supply voltage Vbat. A charge capacitor C is arranged between output terminal O and voltage GND.

The regulator maintains the voltage of output terminal O to a value equal to reference voltage Vref. Any variation in voltage Vbat translates as a variation in voltage Vout, which is transmitted by the feedback loop on terminal $E^-$. Any variation in load R translates as a variation in current Iout provided by the regulator to the load. When load R decreases, current Iout increases. Conventionally, the voltage regulator includes a device of protection against short-circuits intended for limiting the regulator consumption by setting the maximum current that can be provided by the regulator.

The regulator includes a device 4 of protection against short-circuits. Device 4 includes a P-channel MOS transistor T2 having its source connected to the gate of transistor T1. The drain of transistor T2 is connected to the drain and to the gate of an N-channel MOS transistor 6 having its source connected to voltage GND. A current source CS generating a current Iref is also connected to the drain of transistor T2. An N-channel MOS transistor 7 has its source connected to voltage GND and its gate connected to the gate of transistor 6. Transistor 7 is connected to voltage Vbat via a resistor R1. A P-channel MOS transistor T3 has its source connected to voltage Vbat, its drain connected to the gate of transistor T1, and its gate connected to the drain of transistor 7.

Current Irep flowing through transistor T2 depends on current Iout flowing through transistor T1 due to the fact that the sources of these transistors are interconnected and that their gates receive a same signal. The current flowing through transistor 6 is null when current Irep flowing through transistor T2 is smaller than current Iref. No current then flows through transistor 7 and resistor R1, and the gate of transistor T3 has a voltage equal to Vbat. When current Irep is greater than Iref, transistor 6, transistor 7, and resistor R1 are run through by a current equal to Irep−Iref. The gate of transistor T3 then has a potential equal to Vbat−R1(Irep−Iref). Transistors T2 and T3, resistor R1, and current Iref are chosen so that, when current Iout is smaller than a threshold value It, transistor T3 is not on. If current Iout exceeds threshold value It, transistor T3 turns on and tends to bring the gate voltage of transistor T1 to voltage Vbat. Transistor T1 then becomes less conductive and current Iout returns to limiting value It. Circuit 4 thus enables limiting the current in the load to value It. Current It must be greater than the nominal current to be provided by the regulator.

A disadvantage of device 4 is that upon power-on of the regulator, capacitor C is charged with a current equal to current It whatever the value of resistance R. This high-current charge results in heating up and damaging capacitor C.

BRIEF SUMMARY OF THE INVENTION

An object of the present invention is to provide a device of protection against short-circuits which enables avoiding for capacitor C to be run through by a strong current at the regulator power-on.

To achieve this object, the present invention provides a voltage regulator having an output terminal adapted to being connected to a load, including a device for limiting the current flowing through the load to a first threshold current if the voltage of the output terminal is lower than a threshold voltage, and to a second current threshold higher than the first current threshold if the voltage of the output terminal is greater than the threshold voltage.

According to an embodiment of the present invention, the limiting device includes a comparator for comparing the voltage of the output terminal to the threshold voltage, first and second feedback loops for limiting the current flowing through the load respectively to the first and second current thresholds, and a switching block controllable by the comparator to activate either the first or the second feedback loop according to whether the voltage of the output terminal is smaller or not than the threshold voltage.

According to an embodiment of the present invention, the switching block is adapted to providing a current depending on the current running through the load on a first or on a second output, and each feedback loop, connected to an output of the switching block, includes a control block adapted to providing a control signal when it receives from the switching block a current greater than a reference current, and further includes a turn-off means which receives the output of the control blocks and which decreases the current running through the load when any one of the first and second control signals is active.

According to an embodiment of the present invention, the voltage regulator includes a power switch arranged to connect the output terminal to a first supply voltage, and a first operational amplifier having its inverting and non-inverting inputs respectively connected to the reference voltage and to the output terminal, a control terminal of the power switch being connected to the output of the first operational amplifier and the device for limiting the current flowing through the load being connected to the control terminal of the power switch, the load including a capacitor and a first impedance connected in parallel between the output terminal and a second supply voltage.

According to an embodiment of the present invention, the switching block includes a first MOS transistor of a first type having its source connected to the first supply voltage and its gate connected to the control terminal of the power switch, and second and third MOS transistors of the first type having their sources connected to the drain of the first transistor, the drains of the second and third transistors respectively forming the first and second outputs of the switching block.

According to an embodiment of the present invention, the comparator includes fourth and fifth MOS transistors of a second type having their drains connected to the first supply voltage, having their gates respectively connected to the threshold voltage and to the output terminal, the sources of the fourth and fifth transistors being respectively connected to the gates of the second and third transistors, as well as to the second supply voltage via first and second current sources.

According to an embodiment of the present invention, the control block of each feedback loop includes a pair of MOS transistors of the second type having their sources connected to the second supply voltage, having their gates connected to each other and to a current source generating a reference current, the drain and the gate of a first transistor of the transistor pair being interconnected and connected to one of the outputs of the switching block, the current running through the second transistor of the transistor pair corresponding to the control signal provided by the control block.

According to an embodiment of the present invention, the turn-off means which receives the output of the control blocks includes a resistor having a first terminal connected to the first supply voltage and a second terminal arranged to receive the sum of the control signals provided by the control blocks, and a sixth MOS transistor of the first type having its source connected to the first supply voltage, having its drain connected to the control terminal of the power switch, and having its gate connected to the second terminal of the resistor.

According to an embodiment of the present invention, the turn-off means which receives the output of the control blocks includes a second impedance having a first terminal connected to the first supply voltage and a second terminal arranged to receive the sum of the control signals provided by the control blocks, a third impedance, matched with the second impedance, a first terminal of which is connected to the first supply voltage and a second terminal of which receives a predetermined constant current, a second operational amplifier having its non-inverting and inverting inputs respectively connected to the second terminal of the second and third impedances, and a seventh MOS transistor of the first type having its source connected to the first supply voltage, having its drain connected to the control terminal of the power switch, and having its gate connected to the output of the second operational amplifier.

According to an embodiment of the present invention, the first supply voltage, the reference voltage, and the threshold voltage are positive voltages of decreasing values, the second supply voltage is a ground voltage, the power switch and the transistors of the first type are P-channel MOS transistors, and the transistors of the second type are N-channel MOS transistors.

The foregoing objects, features and advantages of the present invention will be discussed in detail in the following non-limiting description of specific embodiments in connection with the accompanying drawings.

DETAILED DESCRIPTION OF THE INVENTION

Figure 1:
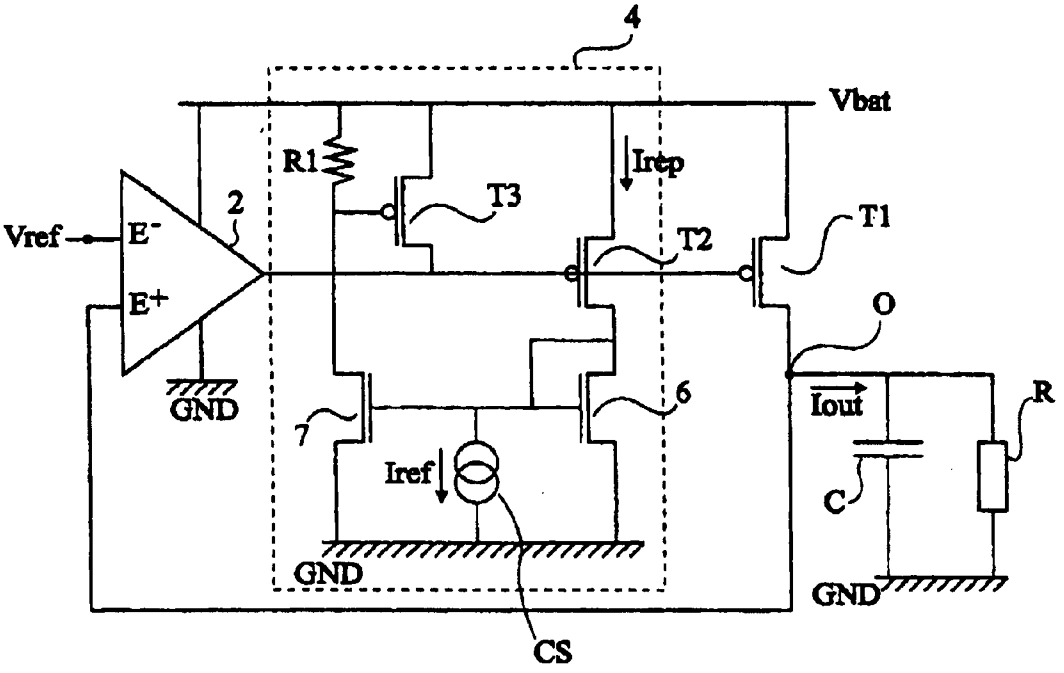
FIG. 1 (Prior Art)
FIG. 1, previously described, schematically shows a voltage regulator provided with a conventional device of protection against short-circuits.
Figure 2:
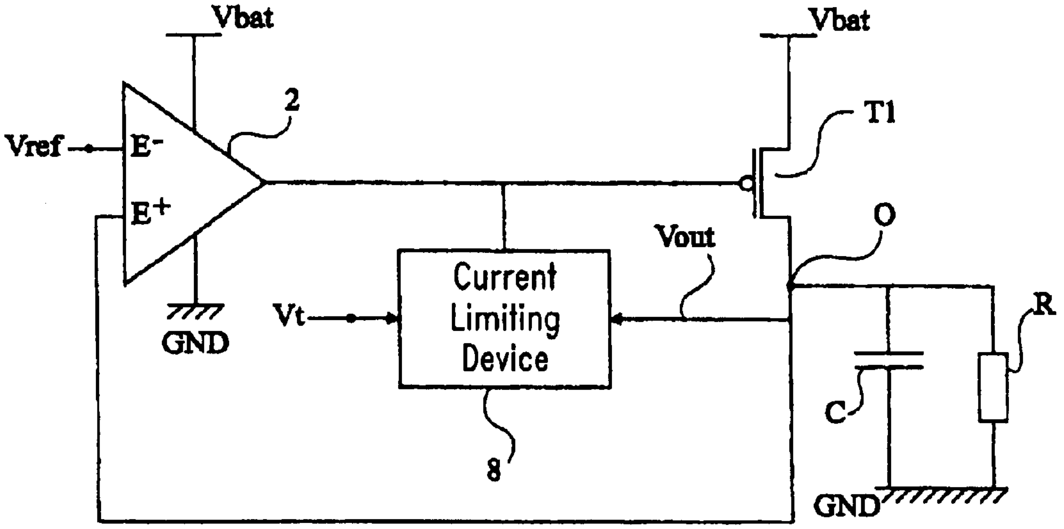
FIG. 2 schematically shows a voltage regulator including a current-limiting device according to the present invention.

FIG. 2 schematically shows a voltage regulator having an output terminal O connected to a load R, and which includes operational amplifier 2, transistor T1 and charge capacitor C of the previously-described conventional regulator. According to the present invention, the regulator includes a current-limiting device 8 having a first input terminal connected to output terminal O and a second input terminal connected to a threshold voltage Vt. Device 8 is further connected to the gate of transistor T1.

Device 8 compares voltage Vout of terminal O with voltage Vt. Voltage Vt is chosen to be smaller than voltage Vref. According to whether Vout is smaller or greater than Vt, current Iout is limited to a first or to a second low or high threshold current It1 or It2. Upon regulator power-on, capacitor C is charged by current It1 until voltage Vout reaches value Vt. Current It1 is low to avoid damaging capacitor C. When voltage Vout becomes greater than voltage Vt, the current running through transistor T1 becomes equal to It2 while capacitor C is not completely charged. The end of the charge of capacitor C occurs with current It2. After the regulator powering-on, if load R becomes small without voltage Vout dropping below voltage Vt, for example in case of a limited short-circuit of load R, current Iout is limited to current It2. The current provided by the regulator then is substantially equal to the current provided by a regulator provided with a conventional protection device if It2=It. If load R becomes very small and voltage Vout drops below voltage Vt, for example, in case of a clear short-circuit, the current running through transistor T1 is limited to current It1. The current provided by the regulator then is smaller than the current provided by a regulator provided with a conventional protection device, which is an additional advantage of the present invention.

Figure 3:
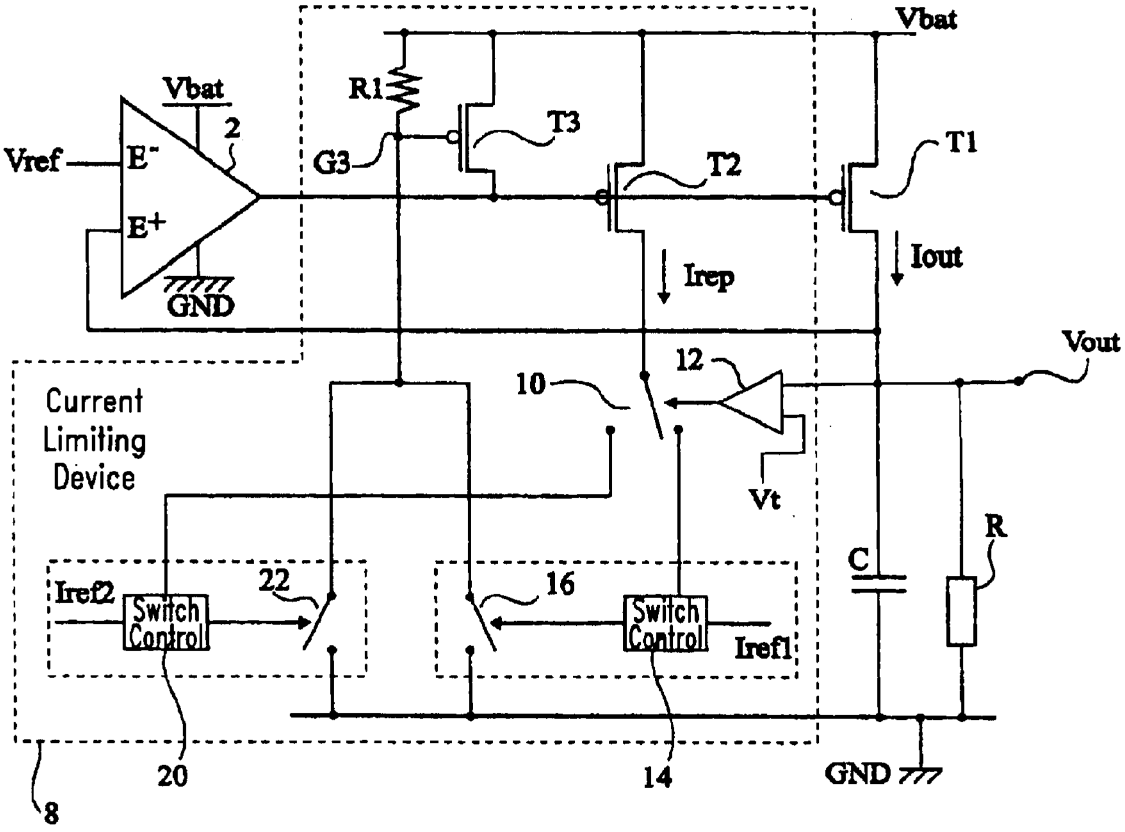
FIG. 3 schematically shows a first embodiment of the voltage regulator of FIG. 2.

FIG. 3 schematically shows a first embodiment of the voltage regulator of FIG. 2. Device 8 includes a P-channel MOS transistor T2, having its source connected to voltage Vbat and its gate connected to the gate of transistor T1. Transistor T2 is arranged to be run through by a current Irep depending on output current Iout. The drain of transistor T2 is connected to an input terminal of a switching means 10. A voltage comparator 12 has a first input terminal connected to output terminal O, a second input terminal connected to a threshold voltage Vt, and is provided to control switching means 10. A first output terminal of switching means 10 is connected to an input terminal of a control means 14, which controls a switch 16, and a second output terminal of switching means 10 is connected to an input terminal of a control means 20 which controls a switch 22. A P-channel MOS transistor T3 has its source connected to voltage Vbat and its drain connected to the gate of transistor T1. The gate of transistor T3 is coupled to a node G3. Node G3 is connected to voltage Vbat via a resistor R1. Further, node G3 is connected to voltage GND via switches 22 and 16, in parallel.

Voltage comparator 12 controls switching means 10 so that current Irep is provided either to control means 14, or to control means 20, according to whether voltage Vout is smaller or greater than voltage Vt.

In the case where voltage Vout is smaller than voltage Vt, current Irep is provided to control means 14. Control means 14 is provided to maintain switch 16 open or closed according to whether current Irep, received on its input terminal, is smaller or greater than a reference current Iref1. When current Irep becomes greater than current Iref1, switch 16 is closed and a current flows through resistor R1. The voltage of node G3 drops, transistor T3 turns on and decreases the conduction of transistors T1 and T2 until current Irep becomes smaller than current Iref1. The circuit acts as a current limiter limiting current Irep to value Iref1. Current Iout is thus limited to a current It1 depending on current Iref1.

In the case where voltage Vout is greater than voltage Vt, switching means 10 is controlled by voltage comparator 12 so that current Irep is provided to the input terminal of control means 20. Control means 20, which has the same structure as control means 14, is provided to maintain switch 22 off or on according to whether the current received on its input terminal is smaller or greater than a reference current Iref2. Current Iout provided by the voltage regulator is then limited to a value It2 depending on current Iref2.

Figure 4:
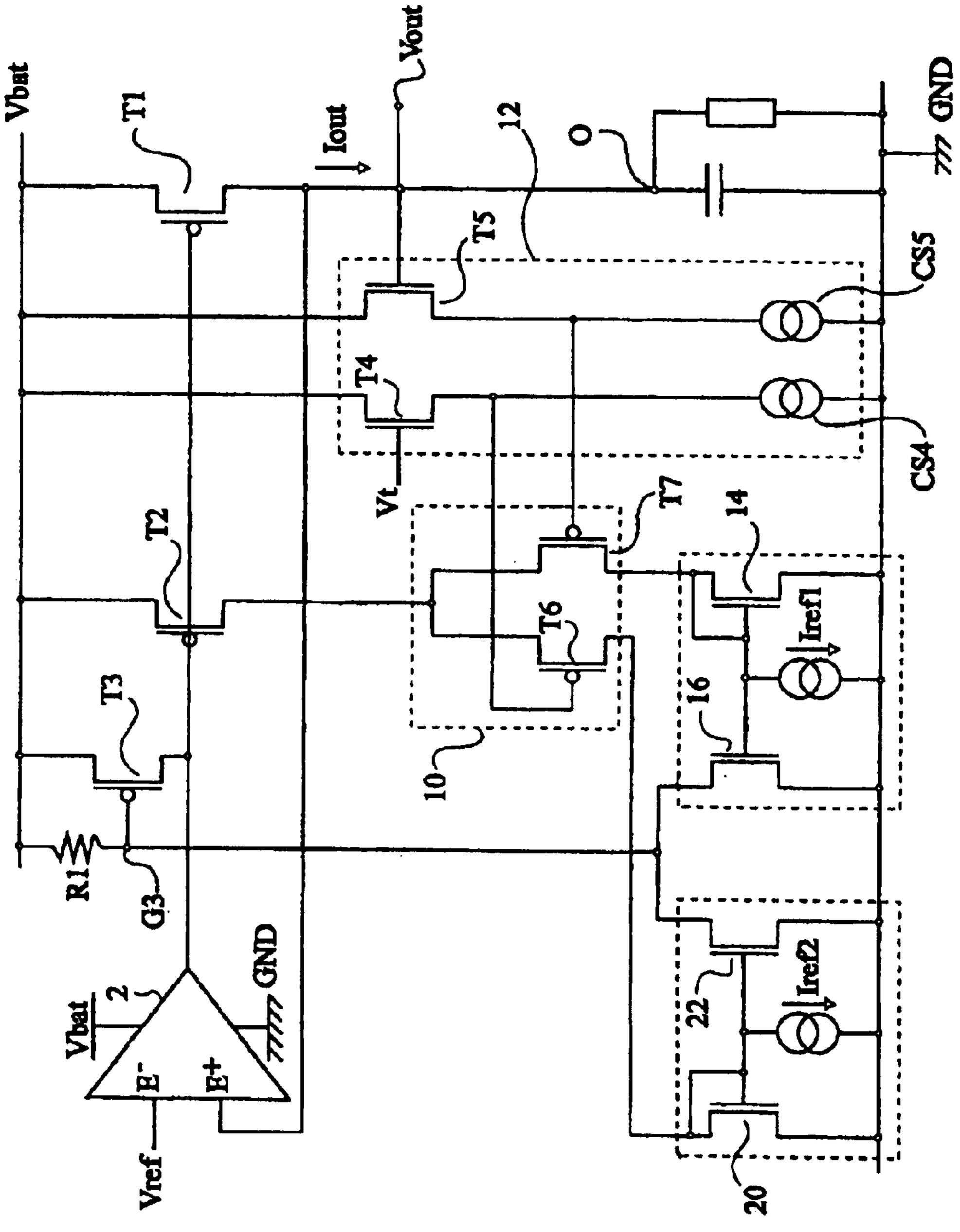
FIG. 4 shows an example of forming of the voltage regulator of FIG. 3.

FIG. 4 shows an example of forming of the voltage regulator of FIG. 3. Voltage comparator 12 includes two N-channel MOS transistors T4 and T5, having their drains connected to voltage Vbat and their sources respectively connected to voltage GND via current sources CS4 and CS5. The gates of transistors T5 and T4 form the first and second inputs of comparator 12. Switching means 10 includes two P-channel MOS transistors T6 and T7 having their sources connected to the drain of transistor T2 and their gates respectively connected to the sources of transistors T4 and T5. Transistors T4 and T5 form a differential pair. The drains of transistors T7 and T6 respectively form the first and second output terminals of switching means 10. Control means 14 includes an N-channel MOS transistor having its source connected to voltage GND, and having its drain and its gate connected to each other as well as to a current source generating current Iref1. The drain and the gate of the transistor of control means 14 form the input terminal of control means 14. Switch 16 is an N-channel MOS transistor connected as a current mirror with the transistor of control means 14. The source of transistor 16 is connected to voltage GND and the drain of transistor 16 is connected to node G3. Control means 20 includes an N-channel MOS transistor having its source connected to voltage GND and having its drain and its gate connected to each other and to a current source generating current Iref2. The drain and the gate of the transistor of control means 20 form the input terminal of control means 20. Switch 22 is an N-channel MOS transistor connected as a current mirror with the transistor of control means 20. The source of transistor 22 is connected to voltage GND and the drain of transistor 22 is connected to node G3.

When voltage Vout is smaller than voltage Vt, the voltage of the source of transistor T5 is smaller than the voltage of the source of transistor T4. As a result, the voltage of the gate of transistor T7 is smaller than the voltage of the gate of transistor T6. Transistor T7 is then more conductive than transistor T6. Transistors T4, T5, T6, and T7 are chosen so that current Irep then only runs through transistor T7 and not through transistor T6. The drain of the transistor of control means 14 then receives current Irep. As long as current Irep is smaller than current Iref1, no current runs through transistors 14 and 16. When current Irep becomes greater than current Iref1, transistors 14 and 16 are run through by a current Irep–Iref1. When current Irep–Iref1 is high enough, the voltage drop across resistor R1 turns transistor T3 on to limit current Iout to a value It1, as described in relation with FIGS. 2 and 3.

When voltage Vout is greater than voltage Vt, current Irep runs through transistor T6 and not through transistor T7. The operation of control means 20 and of switch 22 is then similar to the operation of control means 14 and of switch 16 which has just been discussed and current Iout is limited to a value It2.

Figure 5:
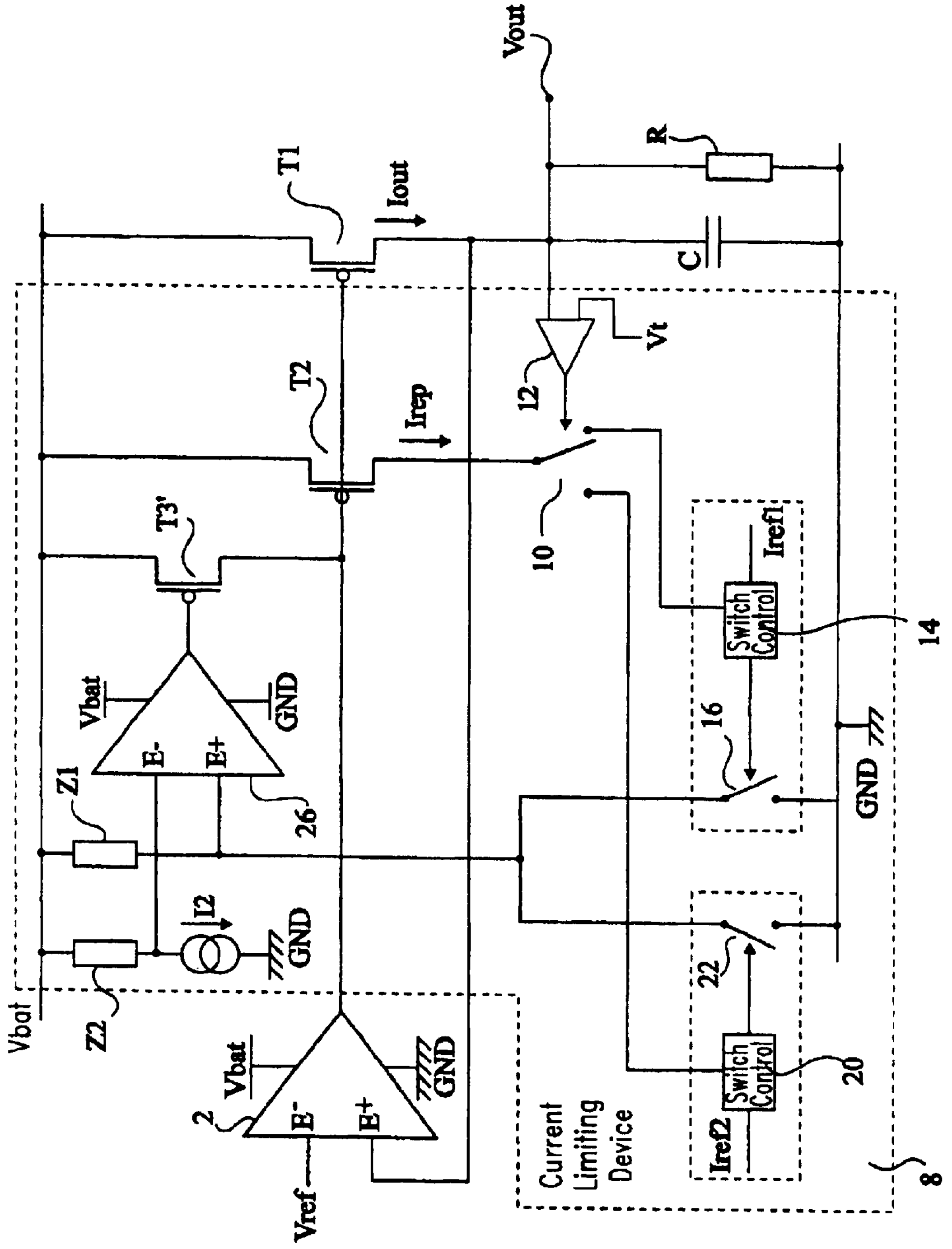
FIG. 5 schematically shows a second embodiment of the voltage regulator of FIG. 2.

FIG. 5 schematically shows a second embodiment of the voltage regulator of FIG. 2. Device 8 includes P-channel MOS transistor T2, voltage comparator 12, switching means 10, switches 16 and 22 and control means 14 and 20 of the previously-described device 8. A P-channel MOS transistor T3' has its source connected to voltage Vbat and its drain connected to the gate of transistor T1. The gate of transistor T3' is connected to the output of an operational amplifier 26 supplied between voltages Vbat and GND. Non-inverting and inverting inputs E+ and E– of amplifier 26 are connected to voltage Vbat respectively via impedances Z1 and Z2. Impedances Z1 and Z2 are equal and matched, so that any variation in the value of Z1, for example due to a temperature or manufacturing process variation, corresponds to an equal variation of Z2. The inverting input of amplifier 26 is also connected to voltage GND via a current source generating a predetermined constant current 12. The non-inverting input of amplifier 26 is connected to voltage GND via switches 16 and 22, in parallel.

The control of transistor T3 by amplifier 26 depends on the ratio of the voltage drops in impedances Z1 and Z2. Impedances Z1 and Z2 being equal and matched, the control of transistor T3' is independent from the values of impedances Z1 and Z2 and only depends on the ratio between the currents flowing through impedances Z1 and Z2. Current 12 flowing through impedance Z2 is constant. The current flowing through impedance Z1 is comparable to the current flowing through resistor R1 of FIG. 3. Current Iout thus depends on Iref1 or Iref2 according to whether voltage Vout is smaller or greater than voltage Vt. The control of transistor T3 being independent from values Z1 and Z2, current Iout is independent from the variations of impedances Z1 and Z2, which is an additional advantage of the present invention. Further, the gain of amplifier 26 may be chosen to be high so that the control of transistor T3' is little responsive to a drift in the threshold voltage of transistor T3', which is another advantage of the present invention.

When current Iout varies abruptly, the current-limiting loop reacts with a delay, especially introduced by amplifier 26. This delay can cause the occurrence of a current peak Iout between the time when current Iout starts increasing and the time when transistor T3' is turned on. A protection block (not shown) may be arranged to turn transistor T3' unconditionally on for a predetermined duration after any abrupt drop in voltage Vout or upon powering on of the voltage regulator, to suppress such a current peak.

Of course, the present invention is likely to have various alterations, modifications, and improvements which will readily occur to those skilled in the art. As an example, the present invention has been described in relation with specific control means 14 and 20, switches 16 and 22, voltage comparator 12, and switching means 10, but those skilled in the art will easily adapt the present invention to a regulator using elements having a different structure but performing same functions.

The present invention has been described in relation with a voltage regulator using positive voltages Vbat, Vref, and Vt, but those skilled in the art will easily adapt the present invention to a voltage regulator using negative voltages by inverting the types of the described MOS transistors.

The present invention has been described in relation with a voltage regulator in which voltage Vt is chosen to be smaller than voltage Vref, but those skilled in the art will easily adapt the present invention to a voltage regulator using equal voltages Vt and Vref. In this case, the differential pair formed by transistors T4 and T5 will be imbalanced to turn transistor T6 on when Vout=Vref=Vt.

For simplicity, the present invention has been described in relation with a voltage regulator using a non-resistive feedback loop and providing a voltage equal to a received reference voltage Vref. However, those skilled in the art will easily adapt the present invention to a voltage regulator having a feedback loop which includes a resistive bridge, and which provides as an output a voltage different from the received voltage Vref.

The present invention has been described in relation with a voltage regulator using a power transistor T1, but those skilled in the art will easily adapt the present invention to a voltage regulator using another type of voltage-controlled power switch.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A voltage regulator comprising:

an output terminal adapted to be coupled to a load; and a device for limiting the current flowing through the load to a first threshold current if a voltage of the output terminal is lower than a threshold voltage, and to a second threshold current higher than the first current threshold if the voltage of the output terminal is greater than the threshold voltage, wherein the limiting device includes:

a comparator for comparing the voltage of the output terminal to the threshold voltage;

a first and second feedback loops for limiting the current flowing through the load respectively to the first and second threshold currents; and a switching block controllable by the comparator to activate either the first or the second feedback loop according to whether the voltage of the output terminal is smaller or not than the threshold voltage.

2. The voltage regulator of claim 1, wherein:

the switching block is adapted to provide a current depending on the current running through the load on a first or on a second output; and each feedback loop, coupled to an output of the switching block, includes a control block adapted to provide a control signal when it receives from the switching block a current greater than a reference current, and further includes a turn-off means which receives the output of the control blocks and which decreases the current through the load when one of the first and second control signals is active.

3. The voltage regulator of claim 2, including:

a power switch arranged to couple the output terminal to a first supply voltage;

a first operational amplifier having its inverting and non-inverting inputs respectively coupled the reference voltage and to the output terminal, a control terminal of the power switch being coupled to the output of the first operational amplifier and the device for limiting the current flowing through the load being coupled to the control terminal of the power switch and the load including a capacitor and a first impedance coupled in parallel between the output terminal and a second supply voltage.

4. The voltage regulator of claim 3, wherein the switching block includes:

a first MOS transistor of a first type having its source coupled to the first supply voltage and its gate coupled to the control terminal of the power switch; and a second and third MOS transistors of the first type having their sources coupled to the drain of the first MOS transistor, the drains of the second and third MOS transistors respectively forming the first and second outputs of the switching block.

5. The voltage regulator of claim 4, wherein the comparator includes fourth and fifth MOS transistors of a second type having drains coupled to the first supply voltage, and having gates respectively coupled to the threshold voltage and to the output terminal, the sources of the fourth and fifth transistors being respectively coupled to the gates of the second and third transistors, as well as to the second supply voltage via first and second current sources.

6. The voltage regulator of claim 5, wherein the control block of each feedback loop includes a pair of MOS transistors of the second type having sources coupled to the second supply voltage, and having gates coupled to each other and to a current source generating a reference current, the drain and the gate of a first transistor of the transistor pair being interconnected and coupled to one of the outputs of the switching block, the current through the second transistor of the transistor pair corresponding to the control signal provided by the control block.

7. The voltage regulator of claim 6, wherein the turn-off means which receives the output of the control blocks includes:

a resistor having a first terminal coupled to the first supply voltage and a second terminal arranged to receive the sum of the control signals provided by the control blocks; and a sixth MOS transistor of the first type having a source coupled to the first supply voltage, having a drain coupled to the control terminal of the power switch, and having a gate coupled to the second terminal of the resistor.

8. The voltage regulator of claim 6, wherein the turn-off means which receives the output of the control blocks includes:

a second impedance having a first terminal coupled to the first supply voltage and a second terminal arranged to receive the sum of the control signals provided by the control blocks;

a third impedance, matched with the second impedance, a first terminal of which coupled to the first supply voltage and a second terminal of which receives a predetermined constant current;

a second operational amplifier having an output, a non-inverting and an inverting inputs respectively coupled to the second terminals of the second and third impedances; and a seventh MOS transistor of the first type having a source coupled to the first supply voltage, having a drain coupled to the control terminal of the power switch, and having a gate coupled to the output of the second operational amplifier.

9. The voltage regulator of claim 8, wherein the first supply voltage, the reference voltage, and the threshold voltage are positive voltages of decreasing values, the second supply voltage is a ground voltage, the power switch and the transistors of the first type are P-channel MOS transistors, and the transistors of the second type are N-channel MOS transistors.

10. A voltage regulator device comprising:

an output terminal of the voltage regulator having an output voltage coupled to a load;

a voltage detection device coupled to the output terminal and supplying a first detection signal in response to detecting that a reference voltage is above the output voltage and a second detection signal in response to detecting that the reference voltage is below the output voltage;

a first current limiting device supplying a first current to the load when the detection signal is in the first condition, the first current limiting device including a first switch coupled to receive the detection signal from the voltage detection device and activate the first current limiting device to supply the first current to the load; and a second current limiting device supplying a second current to the load when the detection signal is in the second condition, the second current limiting device including a second switch coupled to receive the detection signal from the voltage detection device and activate the second current limiting device into supplying the second current to the load when the detection signal is in the second condition.

11. A voltage regulator device comprising:

an output terminal of the voltage regulator;

an operational amplifier coupled between a first supply voltage and a second supply voltage having a noninverting input terminal, an inverting input terminal coupled to a reference voltage, and an output terminal;

an output transistor having a gate, source, and drain wherein the gate is coupled to the output terminal of the operational amplifier, the source is coupled to the first supply voltage, and the drain is coupled to the output terminal of the voltage regulator;

a comparator having a first input terminal coupled to a reference voltage, a second input terminal coupled to the output terminal of the voltage regulator, and first and second output terminals;

a switching circuit having a first and second control terminals coupled to the first and second output terminals of the comparator, a first signal terminal, a second signal terminal, and a current input terminal;

a first control circuit having a first terminal coupled to the first signal terminal, a control terminal coupled to the first signal terminal, a first reference current coupled to the first signal terminal, and a second terminal coupled to a second supply voltage;

a first switch having a control terminal coupled to the first signal terminal, a first terminal coupled to a second supply voltage, and a second terminal coupled to the control output terminal;

a second control circuit having a first terminal coupled to the second signal terminal, a control terminal coupled to the second signal terminal, a second reference current coupled to the second signal terminal, and a second terminal coupled to a second supply voltage;

a second switch having a control terminal coupled to the second signal terminal, a first terminal coupled to the second supply voltage, and a second terminal coupled to the control output terminal;

a voltage level control circuit having a first resistor having a first and second terminals wherein the first terminal is coupled to the first supply voltage and the second terminal is coupled to the third terminals of the first and second switches, a first transistor having gate, source and drain terminals wherein the gate is coupled to the second terminal of the first resistor, the source is coupled to the first supply voltage, and the drain is coupled to the output terminal of the operational amplifier, and a second transistor having gate, source, and drain terminals wherein the gate terminal is coupled to the output terminal of the operational amplifier, the source terminal is coupled to the first supply voltage, and the drain terminal is coupled to the current input terminal of the switching circuit.

12. A voltage regulator device according to claim 11 wherein the comparator is a differential pair of transistors of a second type comprising:

a first transistor having a gate, source, and drain terminals wherein the gate terminal is coupled to the output terminal of the voltage regulator, the source terminal is coupled to a first current source, and the drain terminal is coupled to the first supply voltage; and a second transistor having a gate, source, and drain terminals wherein the gate terminal is coupled to the threshold voltage, the source terminal is coupled to a second current source, and the drain terminal is coupled to the first supply voltage.

13. A voltage regulator device according to claim 11 wherein the switching circuit comprises:

a first transistor of a first type having a gate, source, and drain terminals wherein the gate is coupled to the first output of the comparator, the source terminal is coupled to the drain terminal of the second transistor of the voltage level control circuit, and the drain terminal is coupled to the second input of the first control circuit, and a second transistor of a first type having a gate, source, and drain terminals wherein the gate terminal is coupled to the second output terminal of the comparator circuit, the source terminal is coupled to the drain terminal of the second transistor of the voltage level control circuit, and the drain terminal is coupled to the second input of the second control circuit.

14. A voltage regulator device according to claim 11 wherein the first control circuit comprises:

a transistor of a second type having a gate, source, and drain terminals wherein the gate terminal is coupled to a first current reference and coupled to the drain terminal, and the source terminal is coupled to the second supply voltage.

15. A voltage regulator device according to claim 11 wherein the first switch comprises:

a transistor of a second type having a gate, source, and drain terminals wherein the gate terminal is coupled to a first current reference , the source terminal is coupled to the second supply voltage, and the drain terminal is coupled to the second terminal of the first resistor of the voltage level control circuit.

16. A voltage regulator device according to claim 11 wherein the second control circuit comprises:

a transistor of a second type having a gate, source, and drain terminals wherein the gate terminal is coupled to a second current reference and coupled to the drain terminal, and the source terminal is coupled to the second supply voltage.

17. A voltage regulator device according to claim 11 wherein the second switch comprises:

a transistor of a second type having a gate, source, and drain terminals wherein the gate terminal is coupled to a second current reference, the source terminal is coupled to the second supply voltage, and the drain terminal is coupled to the second terminal of the first resistor of the voltage level control circuit.

18. A voltage regulator device according to claim 11 wherein the voltage level control circuit comprises:

a first and second match resistors having a first and second terminals wherein the first terminals are coupled to the first supply voltage, the second terminal of the first resistor is coupled to a current source, and the second terminal of the second resistor is coupled to the third terminals of the first and second switches; and a amplifier circuit having an inverting input terminal, a noninverting input terminal, and a first and second supply terminals coupled between the first supply voltage and the second supply voltage wherein the inverting input terminal is coupled to the second terminal of the first resistor, and the noninverting terminal is coupled to the second terminal of the second resistor.

19. A voltage regulator device according to claim 11 wherein the transistors of a first type are PMOS transistors and the transistors of a second type are NMOS transistors.

20. A voltage regulator device according to claim 11 wherein the first supply voltage is a positive voltage and the second supply voltage is ground.

21. A method of controlling an output voltage comprising:

determining whether the output voltage is above or below a reference voltage;

producing a first signal if the output voltage is above the reference voltage;

producing a second signal if the output voltage is below the reference voltage;

selecting a first feedback loop in response to receiving the first signal a first switching element, the first feedback loop supplying a first feedback current to lower the output voltage when the first feedback loop is selected; and selecting a second feedback loop in response to receiving the second signal at a second switching element, the second feedback loop supplying a second feedback current to lower the output voltage when the second feedback loop is selected.

22. A voltage regulator comprising:

an output terminal for coupling to a load;

a comparator that compares an output voltage of the output terminal to a threshold voltage;

a first and second feedback loops for limiting current flowing through the load respectively to first and second threshold currents;

a first switch controlled by the comparator to activate the first feedback loop in response to determining that the output voltage is smaller than the threshold voltage; and a second switch controlled by the comparator to activate the second feedback loop in response to determining that the output voltage is larger than the threshold voltage.

23. The voltage regulator of claim 22, wherein:

the comparator includes first and second outputs that control the first and second switches, respectively;

the first feedback loop includes:

a first control block coupled to an output of the first switch and structured to provide a first control signal in response to receiving from the first switch a current greater than a first reference current; and a turn-off means that receives the first control signal from the first control block and decreases the current through the load when the first control signal is active; and the second feedback loop includes:

a second control block coupled to an output of the second switch and structured to provide a second control signal in response to receiving from the second switch a current greater than a second reference current; and the turn-off means which receives the second control signal from the second control block and decreases the current through the load when the second control signal is active.

24. The voltage regulator of claim 22, further comprising:

a third switch coupling the output terminal to a first supply voltage and having a control terminal;

a operational amplifier having inverting and non-inverting inputs respectively coupled to a reference voltage and to the output terminal, and an output coupled to the control terminal of the third switch; and a fourth switch coupled between the first supply voltage and the first and second switches and having a control terminal coupled to the output of the operational amplifier.

25. The voltage regulator of claim 22, further comprising:

a third switch coupling the output terminal to a first supply voltage and having a control terminal;

a fourth switch coupled between the first supply voltage and the first and second switches and having a control terminal coupled to the control terminal of the third switch;

a first current mirror having a first leg coupled in series between the first switch and a second supply voltage and a second leg that is part of the first feedback loop; and a second current mirror having a first leg coupled in series between the second switch and the second supply voltage and a second leg that is part of the second feedback loop.

26. The voltage regulator of claim 22, wherein the comparator includes third and fourth switches and first and second current sources, the third switch and first current source being coupled in series between first and second supply voltages, the fourth switch and the second current source being coupled in series between the first and second supply voltages, a control terminal of the first switch being coupled to a first intermediate node between the third switch and first current source, and a control terminal of the second switch being coupled to a second intermediate node between the fourth switch and second current source.

27. The voltage regulator of claim 22, wherein each feedback loop includes a control block that includes a pair of MOS transistors having respective sources coupled to a first supply voltage, and respective gates coupled to each other and to a current source generating a reference current; a first MOS transistor of the pair having a drain coupled to the gate of the first MOS transistor and to one of the first and second switches, and a second MOS transistor of the pair being coupled between the first supply voltage and a second supply voltage.

28. The voltage regulator of claim 27, wherein the first and second feedback loops share a resistor having a first terminal coupled to the second supply voltage and a second terminal coupled to the second MOS transistor of each feedback loop, the voltage regulator further comprising:

a power switch coupling the output terminal to a first supply voltage and having a control terminal;

a third MOS transistor having a source coupled to the second supply voltage, a drain coupled to the control terminal of the power switch, and a gate coupled to the second terminal of the resistor.

29. The voltage regulator of claim 22, wherein the first and second feedback loops share first impedance having a first terminal coupled to a first supply voltage, and having a second terminal, the voltage regulator further comprising:

a current source;

a third switch coupling the output terminal to the first supply voltage and having a control terminal;

a second impedance, matched with the first impedance, a first terminal of which is coupled to the first supply voltage and a second terminal coupled through the current source to a second supply voltage;

an operational amplifier having a non-inverting input and an inverting input respectively coupled to the second terminals of the first and second impedances, and having an output; and a fourth switch having a first conduction terminal coupled to the first supply voltage, a second conduction terminal coupled to the control terminal of the third switch, and having a control terminal coupled to the output of the operational amplifier.

* * * * *

UNITED STATES PATENT AND TRADEMARK OFFICE

CERTIFICATE OF CORRECTION

PATENT NO. : 6,804,102 B2

DATED : October 12, 2004

INVENTOR(S) : Cécile Hamon et al.

It is certified that error appears in the above-identified patent and that said Letters Patent is hereby corrected as shown below:

Column 8,

Line 9, "coupled the reference" should read -- coupled to the reference --.

Line 67, "of which coupled" should read -- of which is coupled --.

Column 11,

Line 52, "first signal a first switching element" should read -- first signal at a first switching element --.

Signed and Sealed this

Ninth Day of May, 2006

JON W. DUDAS

*Director of the United States Patent and Trademark Office*